Sept. 25, 1923.
A. ROSNER
1,468,883
DRIVING ATTACHMENT FOR MAGNETOS
Filed Dec. 23, 1921   2 Sheets-Sheet 1
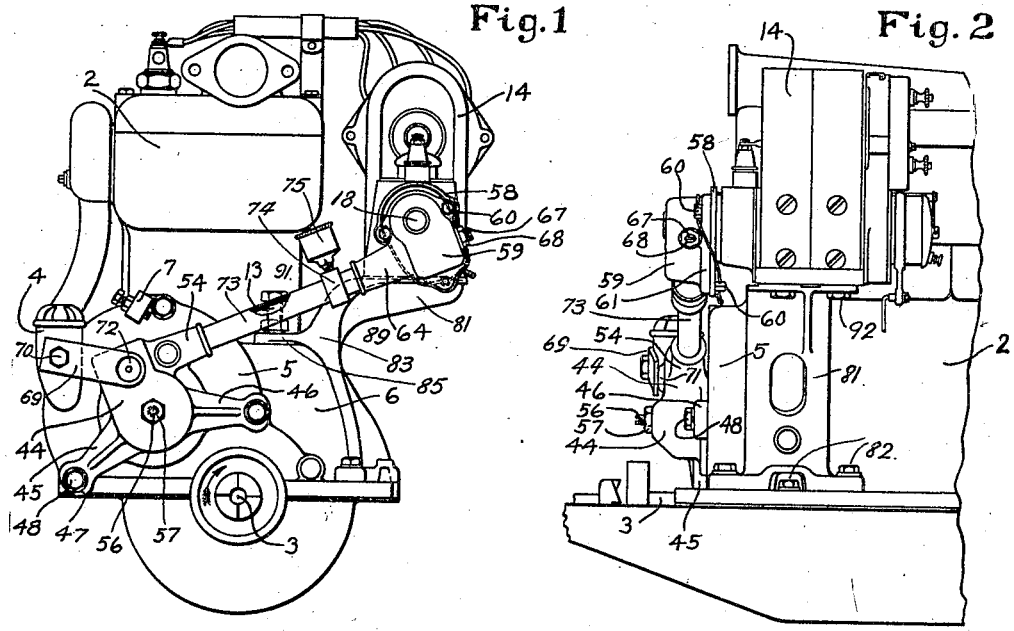
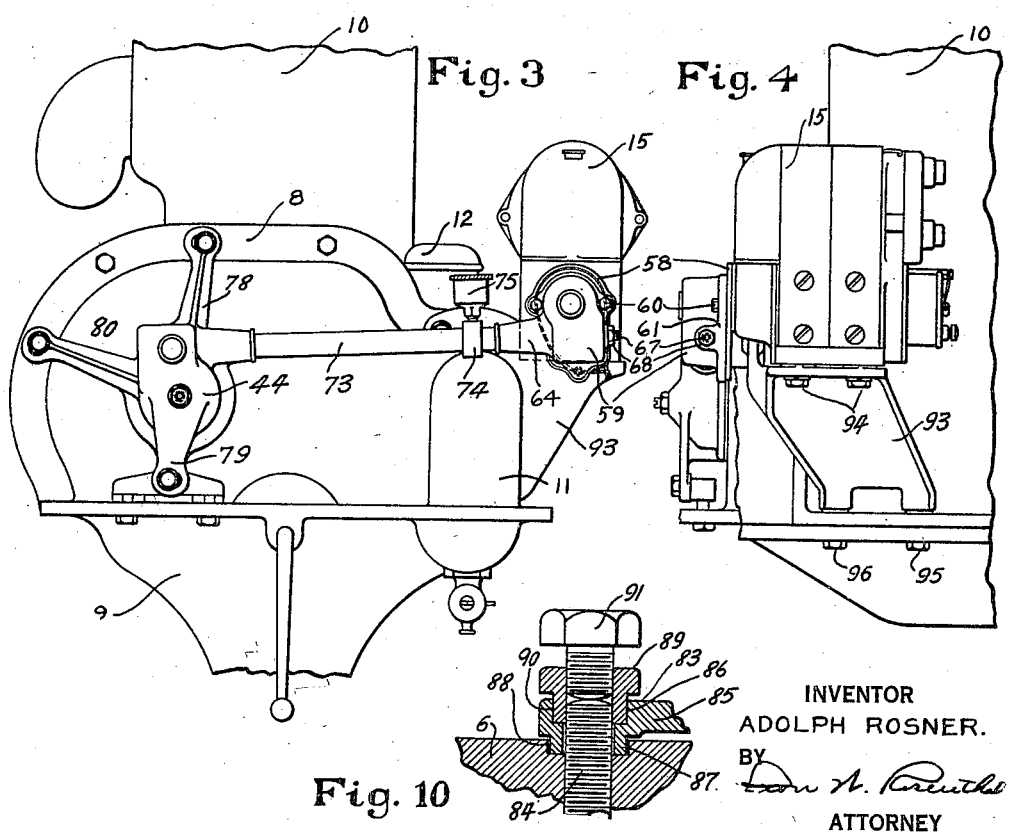
INVENTOR
ADOLPH ROSNER.
BY
ATTORNEY Sept. 25, 1923.
A. ROSNER
DRIVING ATTACHMENT FOR MAGNETOS
Filed Dec. 23, 1921    2 Sheets-Sheet 2
1,468,883
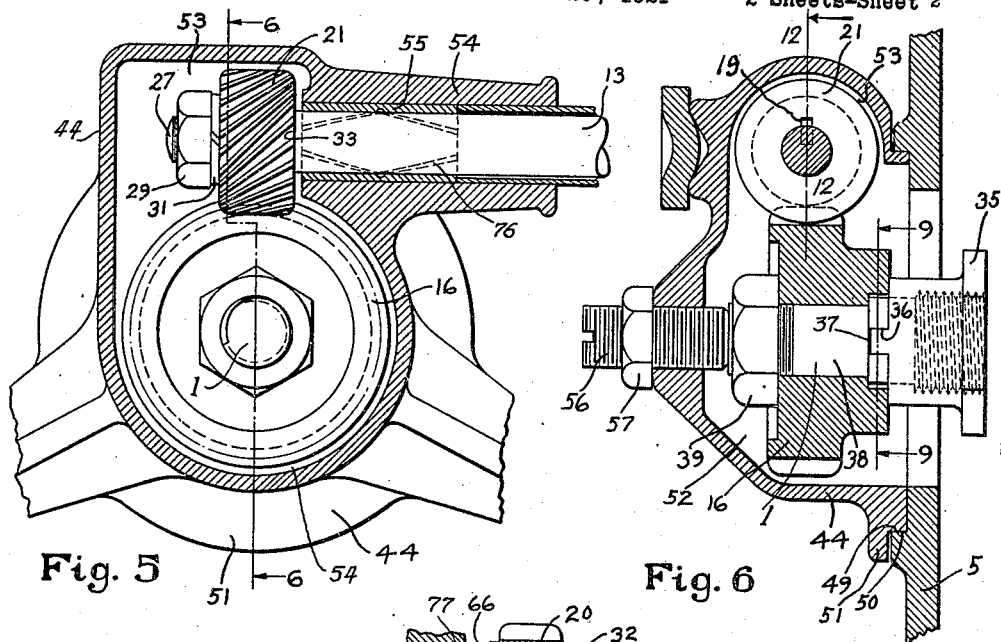
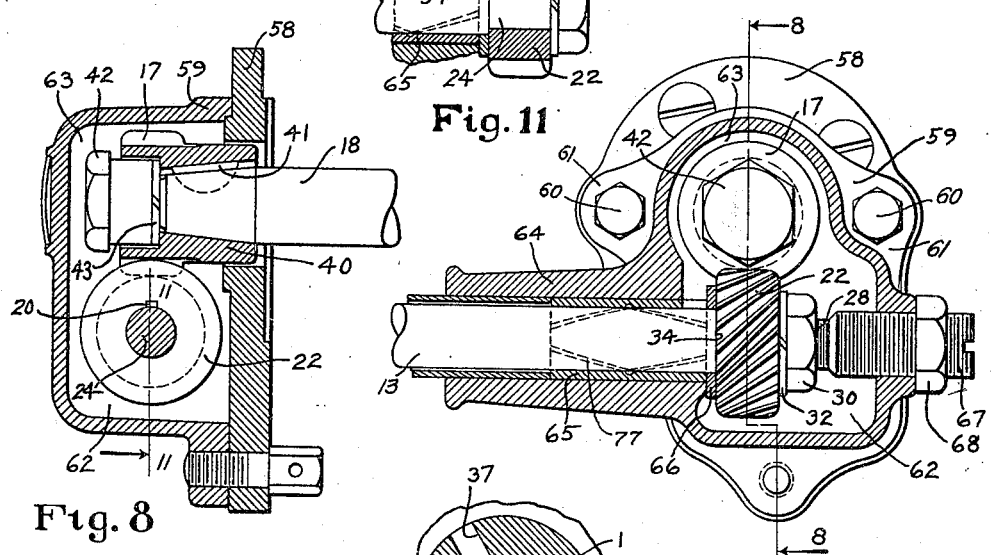
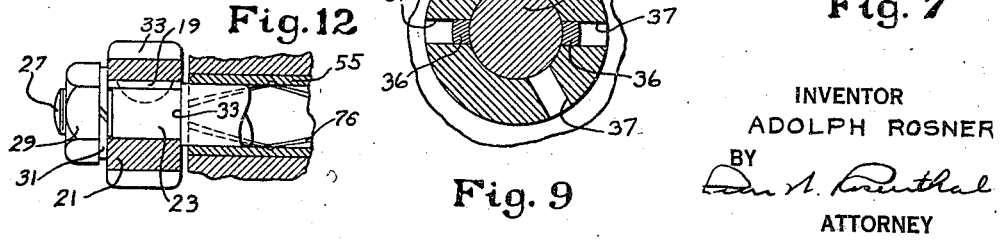
INVENTOR
ADOLPH ROSNER
BY
ATTORNEY Patented Sept. 25, 1923.

1,468,883

UNITED STATES PATENT OFFICE.

ADOLPH ROSNER, OF SPRINGFIELD, MASSACHUSETTS, ASSIGNOR TO AMERICAN BOSCH MAGNETO CORPORATION, OF SPRINGFIELD, MASSACHUSETTS, A CORPORATION OF NEW YORK.

DRIVING ATTACHMENT FOR MAGNETOS.

Application filed December 23, 1921. Serial No. 524,443.

*To all whom it may concern:*

Be it known that I, ADOLPH ROSNER, a citizen of the United States, residing at 4 Ventura Street, Springfield, in the county of Hampden, State of Massachusetts, have invented certain new and useful Improvements in Driving Attachments for Magnetos; and I do hereby declare the following to be a full, clear, and exact description of the invention, such as will enable others skilled in the art to which it appertains to make and use the same.

The present invention relates to driving attachments for driving, from internal combustion engines, magnetos to supply ignition current to the cylinders of the engine, and relates more particularly to the attachment of that kind intended to be installed on existing engines of different types, upon automobiles, tractors and other moving vehicles, as well as on stationary engines.

Heretofore, it was customary to drive the magneto, mounted on the engine, either at the front end or at one side thereof, by a chain passing over sprocket wheels fastened to the magneto shaft and the cam shaft of the engine, or by spur gears on these shafts with or without intermediate gears, the gearing in either type being enclosed in comparatively large housings extending therearound and from shaft to shaft. In some cases, the driving means comprised a magneto drive shaft having bevel or spiral gears meshing with similar gears on the cam and magneto shafts, and each pair of meshed gears had a housing, but the magneto drive shaft was not housed or protected. Such shaft also was of the floating type and had bearings in the individual gear housings, the gears on this shaft being in thrust contact with the respective housings. The driving action of the gears imposed a torque effect upon the housings which tended to cause a movement of the housings to bind against the shaft, such torque and binding effect being taken up by this shaft in its bearings, with the result of undue wear in the bearings and a disalignment of the shaft therewith.

In accordance with this part of my invention, the gear housings are connected by a torque member, preferably in the form of a tube which may enclose or house the magneto drive shaft, the ends of this member or tube fitting tightly in the respective housings, preferably in elongated hub portions thereof, so that the torque member acts as a strut or thrust element between the housings to maintain their correct relation and the proper alignment of the shaft and its bearings in the housings. The hubs may have therein, bearing members, preferably in the form of bushings, against which the ends of the torque member may abut in further aid of maintaining the rigidity of the assembly.

In accordance with another part of my invention, the gear housing at the engine shaft has legs which are secured to the frame of the engine, these legs preferably extending radially from the gear housing, and also preferably having elongated fastening apertures. By such construction, the housings, the magneto drive shaft with the gears thereon and the torque member may be assembled as a unit, and this unit may then be installed in place by a simple fastening of the housings to the engine and magneto frames, it being understood that the magneto has previously been installed upon a suitable bracket fastened to the side of the engine frame near the front end thereof. The elongated fastening openings in the legs of the gear housing at the engine shaft will permit the necessary angular adjustment required to properly connect the gear housing, at the magneto shaft, to the frame of the magneto.

In the accompanying drawing illustrating my invention, in application, as an example, to a Ford type of engine with a magneto driven from the cam shaft of the engine.

Fig. 1 is a front elevation of the attachment applied to the engine of a Ford automobile; Fig. 2 is a side elevation thereof; Fig. 3 is a front elevation of the attachment as applied to an engine of a Fordson tractor; Fig. 4 is a side elevation thereof; Fig. 5 is a front elevation on an enlarged scale of a housing at the engine shaft of Fig. 1 with the cover removed; Fig. 6 is a section on line 6—6 of Fig. 5; Fig. 7 is a front elevation on an enlarged scale of a housing at the magneto shaft of Fig. 1 with the cover removed; Fig. 8 is a view in section taken on line 8—8 of Fig. 7; Fig. 9 is a view in section taken on line 9—9 of Fig. 6; Fig. 10 is a detail sectional view of one of the securing means for the magneto supporting brackets; and Figs. 11 and 12 are detail sectional views taken on lines 11—11 and 12—12 of Figs. 8 and 6, respectively.

Referring more particularly to Figs. 1, 2, 5 and 6, the cam shaft 1 of the engine 2 is driven in anti-clockwise direction by a crank shaft 3 through 1:2 speed reducing gear (not shown). An oil well 4 is integrally formed with a cover or plate 5 bolted to the crank case 6 enclosing the gearing. A belt shifter 7 may be fastened to the cover 5, as in the usual constructions.

In Figs. 3 and 4, a cover 8 of the gear case is bolted to the crank case 9 of the engine 10, and encloses a gearing (not shown), between the crank shaft and the cam shaft to drive the latter in anti-clockwise direction at half speed. A water duct 11 and an oil well 12 may be formed integral with the cover 8, the oil well being located at the rear of the water duct.

The driving attachment illustrated in Fig. 1 is substantially the same as that shown in Fig. 3, excepting the drive shaft 13 of Fig. 1 is shorter than that of Fig. 3, the attachment, in other respects, extending across the front of the engine and providing for different axial positions thereof to accommodate the magnetos 14 or 15 in different relations to the engine, as shown.

As shown particularly in Figs. 5 to 9, inclusive, the attachment consists of a spiral gear 16 made fast upon the end of the cam shaft 1 and a spiral gear 17 made fast upon the armature shaft 18 of the magneto, the mechanical connections between them comprising the drive shaft 13 on which are non-rotatably secured, by suitable keys 19 and 20, spiral gears 21 and 22, respectively in mesh with the gears 16 and 17. Both ends of the shaft 13 have reduced portions 23 and 24 to receive the gears 21 and 22. The ends 27 and 28 of the shaft are threaded to receive nuts 29 and 30 and lock washers 31 and 32 thrusting respectively against one side of the gears 21 and 22, the other side of said gears being seated against the shoulders 33 and 34 on the shaft 13. It will thus be noted that the gears 21 and 22 are so fastened to the drive shaft 13, that such gears will not move either longitudinally or angularly with respect to the shaft 13.

The gear 16 is fastened to the shaft 1 by means of a clutch device comprising a hub nut 35 threaded upon the shaft 1 and having a pair of axial tongues 36 extending into a selected pair of radial slots 37 formed in the rear end of the gear 16, the latter otherwise fitting loosely upon the unthreaded end portion 38 of the shaft 1, but capable of being driven therewith through the above described clutch. The slots 37 are angularly spaced to a unit of a half tooth space of the gear 16, in order that a finer angular adjustment may be had than would be possible by a mere enmeshment of the gears 16 and 21. The outer end of the shaft 1 is screw threaded to receive a thrust nut 39 abutting against the outer end of the gear 16 and adapted to hold such gear in clutch engagement with the member 35, as is clearly shown in Fig. 6 of the drawing. The spiral gear 17 is fastened to the magneto shaft 18 by keying its tapered hub 40 to the shaft 18 by a key 41 and holding it in position thereon by a nut 42 and lock-washer 43.

Each pair of meshed gears 16, 21 or 17, 22 is enclosed in a separate housing. The housing at the cam shaft 1 of the engine comprises a body portion 44 formed with a plurality of radially extending legs 45 and 46, there being but two legs shown in Fig. 1 of the drawing, although it will be understood that any number of legs may be used, as desired. The outer ends of the legs are provided with elongated apertures 47 through which pass securing bolts 48 connected to the plate 5, thus securing the housing 44, with the legs 45 and 46 thereof, to the plate 5. The plate 5 has an angular shoulder 49 cooperating with a shoulder or rim 50 formed integral with the housing 44, such that the rim 50 fits closely within the shoulders 49, with a flange portion 51 overlapping the outer surface of the shoulder 49. The housing 44, as is clearly shown in Figs. 5 and 6 has a central chamber 52 and an upper chamber 53 enclosing the gears 16 and 21, respectively, when in mesh. The housing 44 also has a lateral extension or hub 54 forming a bearing for the drive shaft 13, such bearing being provided with a suitable bushing 55 for such shaft. At the central outer portion of the housing 44 is provided a threaded aperture in which is threaded a thrust screw 56, the inner end of which abuts against the outer end of the shaft 1 for the purpose of preventing axial play or motion of the shaft 1 and the gear 16 during the operation of the engine, a lock nut 57 being used to maintain the abutment screw in adjusted position.

The housing 59 for the set of cooperative gears 17 and 22 at the magneto shaft 18 is fastened to an adapter plate 58 which is secured to the end of the magneto by bolts 60, as is clearly shown in Fig. 7 of the drawing, the part 59 having a flange 61 into which the bolts are threaded. This housing is formed with central and upper chambers 62 and 63, respectively, including the gears 17 and 22, and also has a lateral extension or hub 64 forming a bearing for the upper end of the shaft 13, a suitable bushing 65 being interposed between the shaft and the hub 64, as is clearly shown in Fig. 7 of the drawing. The gear 22, as above stated, is keyed to the upper or outer end of the shaft 13, so that it will not move either longitudinally or angularly with respect to such shaft, and has interposed between the gear 22 and an end of the bushing 65, a thrust washer 66, the latter acting as a thrust bearing member for the gear 22, as the latter tends to move toward the left, as viewed in Figs. 7 and 11 of the drawing, thus preventing such movement and maintaining the gear 22 in proper mesh with the gear 17. The housing 59 also has threaded through the side thereof, a thrust screw 67 abutting at its inner end against the outer end portion of the shaft 13 for the purpose of preventing axial play or motion of the shaft 13 and gear 22. A lock nut 68 threaded upon the bolt 67 maintains it in adjusted position.

In addition to the securing bolts 48, passing through the legs 45 and 46 of the housing 44, a spring arm 69 may also be used to aid in maintaining the housing 44, together with the legs 45 and 46, in place against the plate 5 of the gear casing, the spring 69 being connected at one of its ends to a part of the engine, such as the oil well 4, by means of a screw or bolt 70 and bearing at the other end of such spring arm upon the cover 44 of the housing, the latter being provided with a recess 71 in which the depressed portion 72 of the spring arm 69 is adapted to rest. The apertures 47, in the ends of the arms 45 and 46, are preferably elongated, in angular direction about the axis of the shaft 1, in order that a certain amount of angular adjustment may be permitted when the housing 44 is applied in place when the attachment is connected to the engine and magneto, such adjustment being usually necessary to compensate for whatever manufacturing variations may be present in the several parts when mounting the magneto and attachment in place upon the engine. The shaft 13 is housed or encased in a tubular member 73 extending between and into the bearings or hubs 44 and 64 with the ends of the housing 73 abutting the ends of the bushings 55 and 65, as is clearly shown in Figs. 5 and 7 of the drawing. The tubular member 73 is also provided with a collar 74 into which is threaded a grease cup 75 from which suitable lubricant may be fed into the interior of the housing member 73 and around the shaft 13, such lubricant working its way, under pressure, along the shaft into the bearings 54 and 64 and the bushings 55 and 65. The bushings 55 and 65 are formed with grooves 76 and 77 for the purpose of facilitating the feed of the lubricant to the parts and surfaces to be lubricated thereby. This lubricant may also work its way into the gear housings 44 and 59, if desired, to a sufficient extent to lubricate the engaging parts of the gears 16, 21, 17 and 22, as will be apparent from the illustrations made upon the drawing.

The tubular member 73 besides acting as a housing for the shaft and a lubricant chamber, also acts as a torque arm and an aligning member. The hubs 44 and 64 are of substantial length and the end portions of the housing 73 extend into these hubs a substantial distance, as well as fitting tightly therein with the effect of causing a self-alignment of the parts when assembled. Should the magneto be so mounted that its base is not exactly at a normal to the plane of the inner faces of the gear housings, the tubular member 73 will permit a relative angular movement of the gear housings, about the axis of the housing 73, so that they may fit to their respective seats or plates 5 and 58 without strain. Inasmuch as the ends of the housing 73 abut with the ends of the sleeves or bushings 55 and 65, the spaced relation of the hubs 44 and 64 is maintained. Any torque tendencies of either gear housing will be resisted by the housing 73.

Inasmuch as the gears 21 and 22 are axially fixed upon the shaft 13 and also that these gears are of the spiral type, it is obvious that the driving action of the gear 17 upon the gear 21, as well as the gear 22 upon the gear 17, will have a tendency to cause such gears and shaft 13 to move longitudinally of the axis thereof. In the form shown, this movement would be in a direction to the left, as illustrated in Figs. 1, 3, 5 and 7 of the drawing. In order to prevent such movement or in order to take up the thrust of the shaft, the thrust washer 66 is provided between the gear 22 and the upper or outer end of the bushing 65. Any tendency toward an opposite movement of the shaft will be arrested by the thrust bolt 67 bearing on the end of the shaft 13. In this way the driving relation of the attachment is maintained so that the relation of speeds between that of the armature shaft of the magneto and the cam shaft of the engine, will not vary, irespective of the vibrations the engine may be subjected to.

Inasmuch as the attachment for the Fordson engine, as shown in Figs. 3 and 4 of the drawing, is substantially the same as that shown in Figs. 1 and 2, repetition of the description of the structure will not be made. It will be observed, however, that in the latter structure, the housing 44 is shown as having three legs 78, 79 and 80, the spring arm 69, used in the structure, shown in Figs. 1 and 2, being omitted in this structure. It has been found, by experiment, that it is not necessary to use three legs in a Fordson fitting, but that two legs are sufficient, the leg 80 being preferably omitted in such case.

In the arrangement shown in Figs. 1 and 2, the magneto 14 is mounted upon a bracket 81 bolted to the casing 6 of the engine by suitable bolts 82 and connection 83. The latter comprises one or more stud bolts 84 fastened in the engine casing and extending through the arm 85 into a recess 86 formed therein. The arm 85 has a boss 87 closely fitting in a recess 88 formed in the engine casing for facilitating the locating of the arm, and hence, the bracket, as well as for anchoring said arm. A nut 89, having a flange 90, is threaded upon the end of the stud bolt 84, with the flange seated into the recess 86 for holding the arm rigidly in place. A set screw 91 is then threaded into the nut 89 into binding engagement with the stud 84 for locking the nut 89 to said stud bolt 84.

The magneto is bolted to the bracket 81 by screws 92, as is clearly shown in Fig. 2 of the drawing.

In the arrangement shown in Figs. 3 and 4, the magneto 15 is similarly bolted to a bracket 93 by means of screws 94, the bracket 93 being secured to the side of the frame of the engine by bolts 95 and 96, as is clearly shown in Fig. 4 of the drawing. The magneto 15, in such case, is at a lower position than the magneto 14 shown in Fig. 1, thus requiring a lower location of the shaft 13.

Having thus disclosed my invention what I claim is:

1. In an internal combustion engine having a magneto for supplying ignition current thereto, the combination of a driving attachment for driving said magneto from said engine and comprising a gear on a shaft of the engine, a gear on the shaft of the magneto, a drive shaft having gears thereon and meshed with the respective gears on said engine and magneto shafts, gear housings enclosing the meshed gears at said engine and magneto shafts, and a torque member connected to said housings to maintain a fixed relation between said drive shaft and said housings.

2. In an internal combustion engine having a magneto for supplying ignition current thereto, the combination of a driving attachment for driving said magneto from said engine and comprising a gear on a shaft of the engine, a gear on the shaft of the magneto, a drive shaft having gears thereon and meshed with the respective gears on said engine and magneto shafts, gear housings enclosing the meshed gears at said engine and magneto shafts, and a tubular torque member connected to said housings to maintain a fixed relation between said drive shaft and said housings.

3. In an internal combustion engine having a magneto for supplying ignition current thereto, the combination of a driving attachment for driving said magneto from said engine and comprising a gear on a shaft of the engine, a gear on the shaft of the magneto, a drive shaft having gears thereon and meshed with the respective gears on said engine and magneto shafts, gear housings enclosing the meshed gears at said engine and magneto shafts, and a housing enclosing said drive shaft and being connected to said gear housings to maintain a fixed relation between said drive shaft and said gear housings.

4. In an internal combustion engine having a magneto for supplying ignition current thereto, the combination of a driving attachment for driving said magneto from said engine and comprising a gear on a shaft of the engine, a gear on the shaft of the magneto, a drive shaft having gears thereon and meshed with the respective gears on said engine and magneto shafts, gear housings enclosing the meshed gears at said engine and magneto shafts, and a tubular housing enclosing said drive shaft and being connected to said gear housings to maintain a fixed relation between said drive shaft and said gear housings.

5. In an internal combustion engine having a magneto for supplying ignition current thereto, the combination of a driving attachment for driving said magneto from said engine and comprising a gear on a shaft of the engine, a gear on the shaft of the magneto, a drive shaft having gears thereon and meshed with the respective gears on said engine and magneto shafts, gear housings enclosing the meshed gears at said engine and magneto shafts, and a torque member having its ends fitting tightly in said housings to maintain a fixed relation between said drive shaft and said housings.

6. In an internal combustion engine having a magneto for supplying ignition current thereto, the combination of a driving attachment for driving said magneto from said engine and comprising a gear on a shaft of the engine, a gear on the shaft of the magneto, a drive shaft having gears thereon and meshed with the respective gears on said engine and magneto shafts, gear housings enclosing the meshed gears at said engine and magneto shafts, and a tubular torque member having its ends fitting tightly in said housings to maintain a fixed relation between said drive shaft and said housings.

7. In an internal combustion engine having a magneto for supplying ignition current thereto, the combination of a driving attachment for driving said magneto from said engine and comprising a gear on a shaft of the engine, a gear on the shaft of the magneto, a drive shaft having gears thereon and meshed with the respective gears on said engine and magneto shafts, gear housings enclosing the meshed gears at said engine and magneto shafts, and a housing enclosing said shaft and having its ends fitting tightly in said housings to maintain a fixed relation between said drive shaft and said housings.

8. In an internal combustion engine having a magneto for supplying ignition current thereto, the combination of a driving attachment for driving said magneto from said engine and comprising a gear on a shaft of the engine, a gear on the shaft of the magneto, a drive shaft having gears thereon and meshed with the respective gears on said engine and magneto shafts, gear housings enclosing the meshed gears at said engine and magneto shafts, said gear housings having elongated hub portions, and a torque member having its ends fitting tightly in said hub portions to maintain a fixed relation between said drive shaft and said gear housings.

9. In an internal combustion engine having a magneto for supplying ignition current thereto, the combination of a driving attachment for driving said magneto from said engine and comprising a gear on a shaft of the engine, a gear on the shaft of the magneto, a drive shaft having gears thereon and meshed with the respective gears on said engine and magneto shafts, gear housings enclosing the meshed gears at said engine and magneto shafts, said gear housings having elongated hub portions, and a tubular torque member having its ends fitting tightly in said hub portions to maintain a fixed relation between said drive shaft and said gear housings.

10. In an internal combustion engine having a magneto for supplying ignition current thereto, the combination of a driving attachment for driving said magneto from said engine and comprising a gear on a shaft of the engine, a gear on the shaft of the magneto, a drive shaft having gears thereon and meshed with the respective gears on said engine and magneto shafts, gear housings enclosing the meshed gears at said engine and magneto shafts, said gear housings having elongated hub portions, and a housing enclosing said drive shaft and having its ends fitting tightly in said hub portions to maintain a fixed relation between said drive shaft and said gear housings.

11. In an internal combustion engine having a magneto for supplying ignition current thereto, the combination of a driving attachment for driving said magneto from said engine and comprising a gear on a shaft of the engine, a gear on the shaft of the magneto, a drive shaft having gears thereon and meshed with the respective gears on said engine and magneto shafts, gear housings enclosing the meshed gears at said engine and magneto shafts, said gear housings having elongated hub portions, bearing members fixed in said hub portions, and a torque member having its ends fitting tightly in said hub portions and in abutting contact with said bearing members to maintain a fixed relation between said drive shaft and said gear housings.

12. In an internal combustion engine having a magneto for supplying ignition current thereto, the combination of a driving attachment for driving said magneto from said engine and comprising a gear on a shaft of the engine, a gear on the shaft of the magneto, a drive shaft having gears thereon and meshed with the respective gears on said engine and magneto shafts, gear housings enclosing the meshed gears at said engine and magneto shafts, said gear housings having elongated hub portions, bushings fixed in said hub portions, and a torque member having its ends fitting tightly in said hub portions and in abutting contact with said bushings, to maintain a fixed relation between said drive shaft and said gear housings.

In testimony whereof I affix my signature.

ADOLPH ROSNER.